US012721279B2

(12) United States Patent
Chapon et al.

(10) Patent No.: US 12,721,279 B2
(45) Date of Patent: Sep. 1, 2026

(54) UNLOADING TIPPING APPARATUS AND BALER OR WRAPPER

(71) Applicant: DEERE & COMPANY, Moline, IL (US)

(72) Inventors: Emmanuel Chapon, Velet (FR); Guillaume Blanchon, Gray (FR)

(73) Assignee: DEERE & COMPANY, Moline, IL (US)

( * ) Notice: Subject to any disclaimer, the term of this patent is extended or adjusted under 35 U.S.C. 154(b) by 285 days.

(21) Appl. No.: 18/641,548

(22) Filed: Apr. 22, 2024

(65) Prior Publication Data

US 2024/0423137 A1 Dec. 26, 2024

(30) Foreign Application Priority Data

Jun. 26, 2023 (DE) ......................... 102023116715.4

(51) Int. Cl.
*A01F 15/08* (2006.01)

(52) U.S. Cl.
CPC ................................ *A01F 15/0883* (2013.01)

(58) Field of Classification Search
CPC ............................ A01F 15/0883; A01F 15/07
See application file for complete search history.

(56) References Cited

U.S. PATENT DOCUMENTS

| | | | |
|---|---|---|---|
| 3,472,398 A | 10/1969 | Smith | |
| 4,162,135 A | 7/1979 | Seymour | |
| 2010/0024357 A1* | 2/2010 | Viaud | A01F 15/071 53/116 |

FOREIGN PATENT DOCUMENTS

| | | | |
|---|---|---|---|
| DE | 4138499 A1 | 5/1993 | |
| DE | 202006015516 U1 | 12/2006 | |
| EP | 0910941 A1 | 4/1999 | |
| EP | 2149293 A1 | 2/2010 | |
| EP | 2606714 A1 | 6/2013 | |
| EP | 3338534 A1 | 6/2018 | |
| EP | 4245121 A1 | 9/2023 | |
| GB | 2305648 A1 | 4/1997 | |
| GB | 2597528 * | 2/2022 | A01F 15/07 |
| JP | 3101618 B1 | 10/2000 | |
| WO | WO 0015023 A1 | 3/2000 | |

OTHER PUBLICATIONS

Extended European Search Report and Written Opinion issued in European Patent Application No. 24180488.9 dated Dec. 16, 2024, in 16 pages.

* cited by examiner

*Primary Examiner* — Russell Frejd

(57) ABSTRACT

An unloading tipping apparatus for a baler or a wrapper includes a first supporting element, with which the unloading tipping apparatus can be supported on the ground, a transverse strut, a longitudinal strut, a diagonal strut and a carrier plate. The first supporting element is connected to the carrier plate, and the longitudinal strut and the diagonal strut are connected, at one respective end, to the transverse strut and connected, at the other respective end, to the carrier plate. The unloading tipping apparatus comprises a second supporting element and/or a spacer.

14 Claims, 6 Drawing Sheets

UNLOADING TIPPING APPARATUS AND BALER OR WRAPPER

CROSS-REFERENCE TO RELATED APPLICATIONS

This application claims the benefit of German Patent Application No. DE102023116715.4, filed on Jun. 26, 2023, the disclosure of which is hereby incorporated by reference.

TECHNICAL FIELD

The disclosure generally relates to a bale unloading and tipping apparatus for a baler implement and/or a bale wrapper.

BACKGROUND

In the agricultural sector, crops, especially grass and straw, are baled by means of balers, optionally wrapped, and placed on a field. In a subsequent operation, the bales are loaded onto a trailer and transported away. If a round baler is used, the axis of symmetry of the bale is usually oriented horizontally and transversely to the direction of travel of the baler, and the bale rolls rearward out of the round baler or a wrapper and ultimately ends up with its circumference resting on the field and with its axis of symmetry aligned parallel to the ground. In certain topographic conditions, it may prove to be useful to tip the bale over during ejection so that it comes to rest on its flat end face and cannot roll away or fall over on longitudinal or transverse slopes.

For this purpose, what are known as unloading tipping apparatuses for round bales have been described, which comprise ramps for the bale to be ejected, which ramps can be tilted rearward and downward and can also be pivoted to the side in order to tip the bale onto its side or end face (GB 2 305 648 A, EP 0 910 941 A1, EP 2 149 293 A1), but these require at least one additional actuator for the pivoting movement and are thus relatively complex.

By contrast, unloading tipping apparatuses comprising a chassis, which is drawn behind the baler or the wrapper and has a wheel rolling on the ground and a surface that tips the bale rolling thereon to the side, are less complex (U.S. Pat. No. 4,162,135 A, DE 41 38 499 A1, JP 3101618 B1). The unloading tipping apparatuses are coupled to the baler or the wrapper so as to be able to pivot freely about the transverse axis, so that they are able to follow the contours of the ground and, according to DE 41 38 499 A1, a lifting apparatus may be provided in order to protect the unloading tipping apparatus against damage when turning in the field or when traveling on the road. Accordingly, an associated actuator is also provided in this case, for example in order to prevent the unloading tipping apparatus, when reversing, from becoming stuck in a furrow and being damaged or even from damaging the baler or the wrapper.

SUMMARY

The present disclosure is therefore based on the object of proposing an unloading tipping apparatus for round bales and a baler or a wrapper by means of which the aforementioned problems are overcome. In particular, an unloading tipping apparatus for round bales and a baler or a wrapper are proposed that make it possible to unload the round bale in a predefined direction and/or in a predefined position and/or to prevent damage to the unloading tipping apparatus or reduce the risk of damage.

According to the disclosure, an unloading tipping apparatus, in particular for round bales, for a baler or a wrapper, is proposed. The unloading tipping apparatus comprises a first supporting element, with which the unloading tipping apparatus can be supported on the ground, a transverse strut, a longitudinal strut, a diagonal strut and a carrier plate. The first supporting element is connected, in particular releasably or fixedly fastened, to the carrier plate. The carrier plate is connected, in particular releasably or fixedly fastened, to the longitudinal strut. The longitudinal strut and the diagonal strut are connected, in particular releasably or fixedly fastened, at one respective end, to the transverse strut and connected, in particular releasably or fixedly fastened, at the other respective end, to the carrier plate. The unloading tipping apparatus comprises a second supporting element and/or a spacer.

In the text that follows, connected, in particular releasably or fixedly fastened, may be understood to mean that the components are connected to one another using fastening elements, for example screws and nuts and/or pegs and/or bolts and/or rivets or any other suitable fastening elements and/or, for example, are welded to one another and/or mortised and/or adhesively bonded and/or connected to one another in any other suitable manner.

The unloading tipping apparatus may be connectable or connected, preferably attachable or attached, so as to be able to pivot, to a wrapper for round bales or to a baler, in particular to a round baler. The unloading tipping apparatus may be able to be drawn across a field by the baler or the wrapper. Specifically, the unloading tipping apparatus may be able to pivot about a horizontal pin of the wrapper or the baler, said pin extending transversely to a forward direction.

The longitudinal strut, the diagonal strut and the transverse strut may be configured and arranged with respect to one another in such a manner that a round bale is deflected to the side and comes to rest with its flat end side on the ground. Specifically, on account of the configuration and arrangement of the longitudinal strut, the diagonal strut and the transverse strut, a round bale may be able to be deflected in such a manner that it comes to rest with its flat end side on the ground. The round bale may roll out or roll down from a baling chamber of the baler or a device that is able to pivot, preferably by means of an actuator, of the wrapper, in or on which the round bale lies or rests during baling or wrapping. In the process, the round bale may be able to be deflected to the side using the unloading tipping apparatus. In other words, the longitudinal strut and the diagonal strut are connected, at one respective end, to the transverse strut and connected, at the other respective end, to the carrier plate in such a manner and/or are configured in such a manner that a round bale is deflected to the side and comes to rest with its flat end side on the ground. The unloading tipping apparatus is thus advantageously at least partially in the form of a deflecting means and is able to deflect a round bale that rolls down from the baler or the wrapper to the side such that it comes to rest with its flat end side on the ground.

The diagonal strut may extend from the transverse strut to the carrier plate. Specifically, the diagonal strut may extend obliquely rearward and laterally from the transverse strut. The diagonal strut may be connected to the carrier plate below the rear region of the longitudinal strut. The carrier plate may extend vertically and/or along the longitudinal strut. Additionally or alternatively, the carrier plate may, however, also extend in the forward direction V of the baler or the wrapper. Moreover, the carrier plate may be connected to the longitudinal strut, preferably releasably or fixedly connected to the longitudinal strut, for example screwed or welded or fastened to the longitudinal strut in any other suitable manner. Specifically, the carrier plate may be arranged on the underside of the longitudinal strut. The carrier plate may be triangular. Moreover, the carrier plate may be perforated in order to reduce weight. The carrier plate, in particular at its rear, lower end, may be connected, in particular releasably connected, to the first supporting element, which is used to support the unloading tipping apparatus on the ground. Specifically, for this purpose, a pin of the first supporting element, a first supporting pin, may be connected to the carrier plate, preferably the first supporting pin may be releasably or fixedly fastened to the carrier plate. The carrier plate, in particular at its rear, lower end, may support or bear the first supporting pin. The first supporting pin may support the first supporting element and/or be rotatably connected thereto. The first and/or second supporting element may be in the form of wheels or runners, with which the unloading tipping apparatus is supported on the ground.

When the round bale rolls down rearward over the unloading tipping apparatus in order to be placed on the field, the second supporting element and/or the spacer prevent(s) the unloading tipping apparatus from being damaged during any possible reversing in order to turn in a field or during transporting or during implementation of the baler or the wrapper in a field. During maneuvering, the unloading tipping apparatus is prevented from coming into contact with the ground and/or an obstacle, and, as a result, is not damaged. The unloading tipping apparatus may thus advantageously be able to be supported, at least temporarily and/or partially, on the ground and/or against an obstacle or the ground using the second supporting element and/or the spacer, in addition to the first supporting element, and may thus prevent damage to the unloading tipping apparatus.

In one configuration of the disclosure, the second supporting element is connected to the carrier plate. Likewise, the first and second supporting elements may be connected to the carrier plate. The second supporting element may be releasably or fixedly connected to the carrier plate, particularly preferably rotatably and releasably fastened or rotatably and fixedly fastened to the carrier plate. However, the first and second supporting elements may also be releasably or fixedly connected to the carrier plate, particularly preferably rotatably and releasably fastened or rotatably and fixedly fastened to the carrier plate. The carrier plate, in particular at its rear, lower end, may be connected to the second supporting element, which may be used to support the unloading tipping apparatus, at least temporarily and/or partially, on the ground. Specifically, for this purpose, a pin of the second supporting element, a second supporting pin, may be connected to the carrier plate, preferably the second supporting pin may be releasably or fixedly fastened to the carrier plate. The carrier plate, in particular at its rear, lower end, may support or bear the second supporting pin. The second supporting pin may support the second supporting element and/or be rotatably connected thereto. The first and second supporting pins may be arranged parallel and/or coaxially to one another if the first and second supporting elements are connected to the carrier plate.

In one configuration of the disclosure, the spacer is connected to the carrier plate, in particular releasably or fixedly fastened, to the carrier plate. The spacer may be in one part, thus in the form of a single component, or in multiple parts, thus comprising multiple components. The spacer may be in the form of a rod or tube and/or runner, for example. The spacer may be U-shaped. The spacer may extend toward the carrier plate, in particular along the carrier plate. The spacer may be arranged and fastened below the carrier plate. The spacer can advantageously prevent the unloading tipping apparatus from being damaged during reversing or transporting or during implementation of the baler or the wrapper in a field. During maneuvering, the unloading tipping apparatus is prevented from coming into contact with the ground and/or an obstacle, and, as a result, is not damaged. The unloading tipping apparatus may thus advantageously be able to be supported, at least temporarily and/or partially, on the ground and/or against an obstacle on the ground using the spacer, in addition to the first and/or second supporting element.

As a further advantageous measure, the spacer is connected to the first and/or second supporting element, in particular releasably or fixedly fastened to the first and/or second supporting element. Alternatively, the spacer may be connected to the first and/or second supporting element and the carrier plate, in particular releasably or fixedly fastened to the first and/or second supporting element and the carrier plate.

In one configuration of the disclosure, the spacer comprises a runner and/or sliding rail or may in particular be in the form of a runner or sliding rail. However, the spacer may alternatively also be runner-like or rail-like. Advantageously, this enables sliding over an obstacle or the ground.

In one configuration of the disclosure, the spacer comprises a spacer element. The spacer may also comprise a first and second holder. A first end of the spacer element may be connected to the first holder and a second end of the spacer element may be connected to the second holder, in particular releasably or fixedly connected, particularly preferably releasably or fixedly fastened thereto. Moreover, a spacer runner may be connected, preferably releasably or fixedly connected, particularly preferably releasably or fixedly fastened, to the spacer element. The spacer runner may be in the form of a runner or sliding rail, for example. The spacer runner may extend along the spacer element. The first and second holders may be connected to the carrier plate, preferably releasably or fixedly connected thereto, particularly preferably releasably or fixedly fastened thereto. Specifically, the first and second holders may be arranged on and connected to the carrier plate in such a manner that the spacer element extends along the carrier plate. Advantageously, this enables the spacer element to be removable from the unloading tipping apparatus or replaceable in a simple manner.

In one configuration of the disclosure, a spacer runner or a sliding rail is connected to the spacer element. However, the spacer element may also be in the form of a runner or sliding rail. This can advantageously enable sliding and/or prevent the unloading tipping apparatus from being jolted when the unloading tipping apparatus hits an obstacle.

In one configuration of the disclosure, the first and/or second supporting element are/is in the form of a wheel. Alternatively, the first and/or second supporting element may be in the form of a runner or sliding rail.

The disclosure also relates to a baler or a wrapper having an unloading tipping apparatus described herein. The baler may be a round baler for forming round bales of crop. The baler may comprise a baler frame. The baler may also be in the form of a combination with a wrapper. The baler may be supported on the ground by wheels. The baler may comprise a pick-up unit, in particular a pick-up, for picking up crop. The baler may also comprise a baling chamber. The baling chamber may comprise one or more baling means. The baler may moreover comprise a conveyor unit, for example a rotor or a conveyor belt. The baling chamber may be used to form the round bale, in particular in a baling phase. The baler may comprise a wrapping device for wrapping the fully formed bale with a wrapping material, for example a mesh, film or twine. The fully formed round bale may be wrapped with the wrapping material by the wrapping device in the baling chamber. The baler may comprise an ejection unit, for example an ejection flap or a rear part or a tailgate of the baler. The fully formed round bale or the fully wrapped round bale may be unloaded or ejected via the ejection unit of the baler, in particular via the baling chamber provided with the ejection unit. The round bale can roll out of the baling chamber of the baler and be able to be deflected to the side using the unloading tipping apparatus. The baler may be designed with a variable-size baling chamber or in the form of a baler with a variable baling chamber. The baler with a variable-size baling chamber may comprise one or more baling means, wherein the baling means may be, in particular, in the form of a belt or strap or chain assembly or band. The baler may equally also comprise a size-invariable baling chamber. In this instance, a baling means may be in the form of a baling roller, in particular a multiplicity of baling rollers running parallel to one another, for baling the crop. The axes of rotation of the baling rollers may lie on an arc in the case of a closed ejection unit, and at least one of the baling rollers may be driven. The arrangement of the baling rollers in the baling chamber may correspond to a cylindrical shape, such that the baling rollers are arranged cylindrically about the round bale and form a cylindrical circumferential surface. The baling chamber may be arranged on the baler frame, preferably connected thereto and/or fastened thereto. The pick-up unit for picking up or for collecting crop lying or standing on a field, and/or for transporting the crop into the baling chamber may likewise be arranged on the baler frame, preferably connected thereto and/or fastened thereto.

The wrapper for wrapping the bale may be outside the baler, in particular outside the baling chamber. The wrapper may comprise a wrapper frame. The wrapper may be supported on the ground by wheels. The wrapper may comprise a wrapping device for wrapping the fully formed bale with a wrapping material, for example a mesh or film. The wrapping device may comprise two wrapping arms. The fully formed round bale may thus be wrapped with wrapping material by the wrapping device outside the baling chamber using the wrapper. The wrapper may comprise a pivotable device, for example a wrapping table or platform, on which the round bale is supported. The pivotable device may be pivotable by means of an actuator, for example in the form of a hydraulic cylinder or pneumatic cylinder or lifting cushion or screw drive or rack-and-pinion drive or electric cylinder or motor or stepper motor. The pivotable device may be pivotable between a horizontal position and a rearwardly tilted position using the actuator. In the horizontal position, the round bale lies on the device during wrapping, and the device is tipped rearward by the actuator in order to allow the round bale to roll down using the unloading tipping apparatus and to be placed on the field. The round bale may roll out or roll down from the pivotable device of the wrapper, in or on which the round bale lies or rests during wrapping. In the process, the round bale may be able to be deflected to the side using the unloading tipping apparatus.

The unloading tipping apparatus may be connected, preferably releasably or fixedly fastened and pivotably connected or fastened, to the baler, in particular to a frame of the baler, or to the wrapper, in particular to a frame of the wrapper or a wrapper frame or the pivotable device of the wrapper, so as to be able to pivot about a pin, that is to say a pivot pin, that extends transversely to a forward direction (V). Specifically, the transverse strut of the unloading tipping apparatus, in particular at its two lateral ends, may be connected to, in particular articulated on, the baler or the wrapper so as to be able to rotate or pivot along or toward the pivot pin and about the pivot pin, particularly preferably may be connected to or articulated on the frame of the baler or the frame of the wrapper or the pivotable device. The pivot pin may be a horizontal pin that extends transversely to a forward direction (V). The unloading tipping apparatus may be able to be drawn across a field by the baler or the wrapper.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
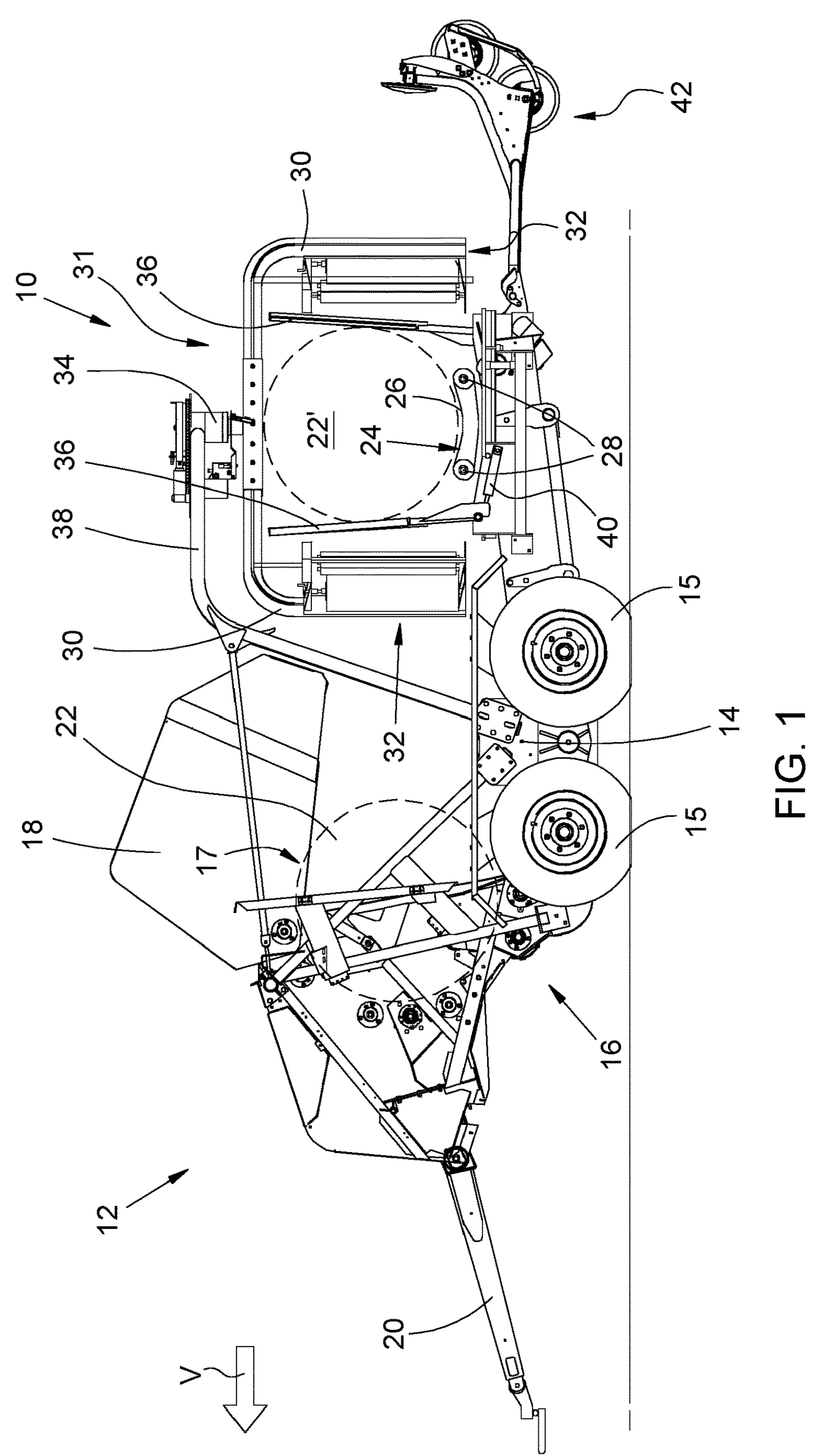
FIG. 1 is a schematic illustration of a combination of a baler and a wrapper according to the disclosure with a first exemplary embodiment of an unloading tipping apparatus according to the disclosure.

Referring to the FIGS., wherein like numerals indicate like parts throughout the several views, FIG. 1 shows a schematic illustration of a combination 12 of a baler 16 and a wrapper 10 according to the disclosure with a first exemplary embodiment of an unloading tipping apparatus 42 according to the disclosure. The baler 16 is used to bale organic material picked up from a field into a round bale, and the wrapper 10 is used to wrap the round bale with film or another wrapping material. The combination 12 is constructed on a frame 14, which is supported on wheels 15 on the ground. The baler 16 comprises a rear door 18. During operation, the combination 12 is drawn across a field in a forward direction V by a drawbar 20 behind a towing vehicle (tractor), which is not shown. The combination 12 is described in detail in EP 1 186 225 A1, the disclosure of which is included by reference in the present documents. It should be noted that, instead of the combination 12 shown in FIG. 1, a baler 16 or a wrapper 10, which are moved across a field using associated towing vehicles, could also be used independently of one another with the unloading tipping apparatus 42. The combination 12 or the baler 16 and/or the wrapper 10 could also be self-propelled.

The baler 16 may comprise a pick-up unit (not illustrated) for picking up crop, and a baling chamber 17 in order to form or bale the picked-up crop into a round bale. The baling chamber 17 may be arranged at or on the frame 14 of the baler 16, preferably connected thereto and/or fastened thereto and/or carried thereon. The wrapper 10 for wrapping the round bale 22' may be outside the baler 16, in particular outside the baling chamber 17.

The wrapper 10 comprises a wrapping device 31 for wrapping the fully formed bale with a wrapping material, for example a mesh or film. The wrapper 10 may comprise a wrapper frame, in the present case in the form of a carrier frame 38. The wrapper 10 comprises a pivotable device 24, which in the present case is in the form of a wrapping table, on which the round bale is supported. The pivotable device 24 may be pivotable by means of an actuator 40. The wrapping device 31 may comprise two wrapping arms 30. The fully formed round bale 22 may thus be wrapped with wrapping material by the wrapping device 31 outside the baling chamber 17 using the wrapper 10. The wrapped round bale 22' may roll out or roll down from the pivotable device 24 of the wrapper 10, in or on which the round bale lies or rests during wrapping. In the process, the wrapped round bale 22' may be able to be deflected to the side using the unloading tipping apparatus 42.

A round bale 22 produced in the baler 16 may be brought out of the baler 16 and into a wrapping position in the wrapper 10 using the pivotable device 24 of the wrapper 10. During the wrapping operation, a round bale 22' to be wrapped thus lies on the device 24, which comprises a belt 26, which revolves around two drums 28 fastened to a framework 66. The two diametrically opposed wrapping arms 30 with mutually perpendicular vertical and horizontal portions revolve around the round bale 22' above the device 24. Each vertical portion of the wrapping arms 30 supports a film dispenser 32. The central ends of the horizontal portions of the wrapping arms 30 are connected to a drive assembly 34 configured to rotate the wrapping arms 30 about a central, vertical axis. The drive assembly 34 is connected to the frame 14 by a wrapper frame, in the present case in the form of a carrier frame 38, and comprises a hydraulic motor, which is connected to the hydraulic system of the towing vehicle. During the wrapping operation, the drive assembly 34 or a separate hydraulic motor also drives the drums 28, so that the round bale 22' rotates about its horizontal center axis, while the wrapping arms 30 rotate about the round bale 22' and film is unwound from the film dispensers 32 and wrapped around the round bale 22'. Film holders 36 press the film against the round bale 22' during the start of the wrapping operation and cut the film after wrapping. The speeds of the wrapping arms 30 and the drums 28 may be synchronized, in order to achieve a desired positioning of the film on the round bale 22'.

In order to place the finished bale 22' on a field, the framework 66 (see FIG. 2) of the device 24 is able to be pivoted, in particular able to be pivoted rearward and downward, in particular about a pin that extends horizontally and transversely to the forward direction V, by means of the actuator 40. In another embodiment, which is not shown, the actuator 40 is in the form of a motor (which may be connected to the device 24, for example by sprockets and a chain or a belt), which is also used to transport the movable device 24 from a forward position for taking over the bale 22 from the baler 16 into the wrapping position shown in FIG. 1 in the wrapper 10 and also brings about the tipping movement. Details in this regard are disclosed in EP 1 186 225 A1, the disclosure of which is included by reference in the present documents.

In order to ensure that the round bale 22' does not come to rest on its circumference on the field and, in the case of unfavorable topographic conditions, cannot roll away or fall over, provision is made for the unloading tipping apparatus 42.

Figure 2:
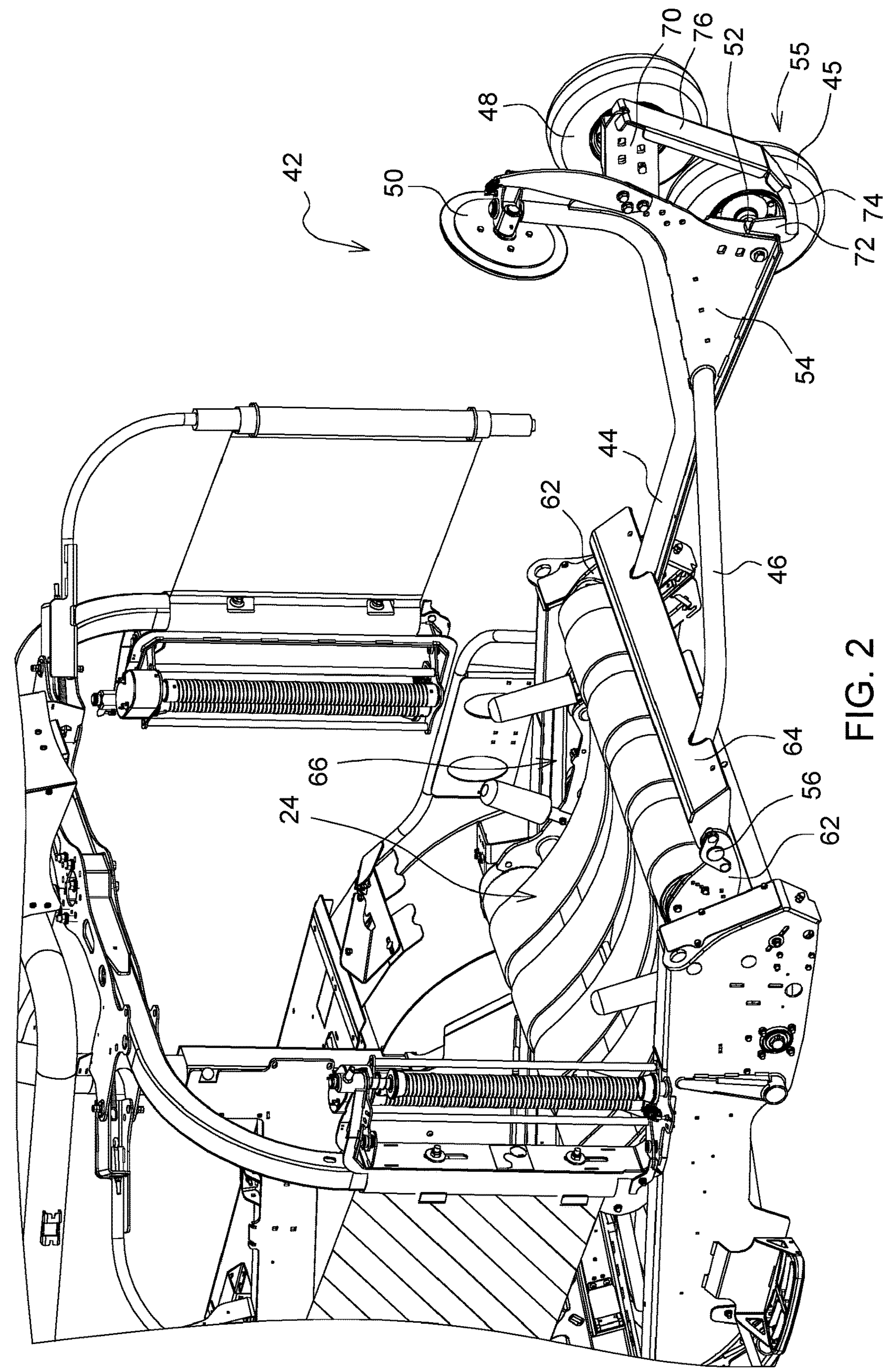
FIG. 2 is a schematic perspective view of a wrapper according to the disclosure with a second exemplary embodiment of an unloading tipping apparatus according to the disclosure.
Figure 3:
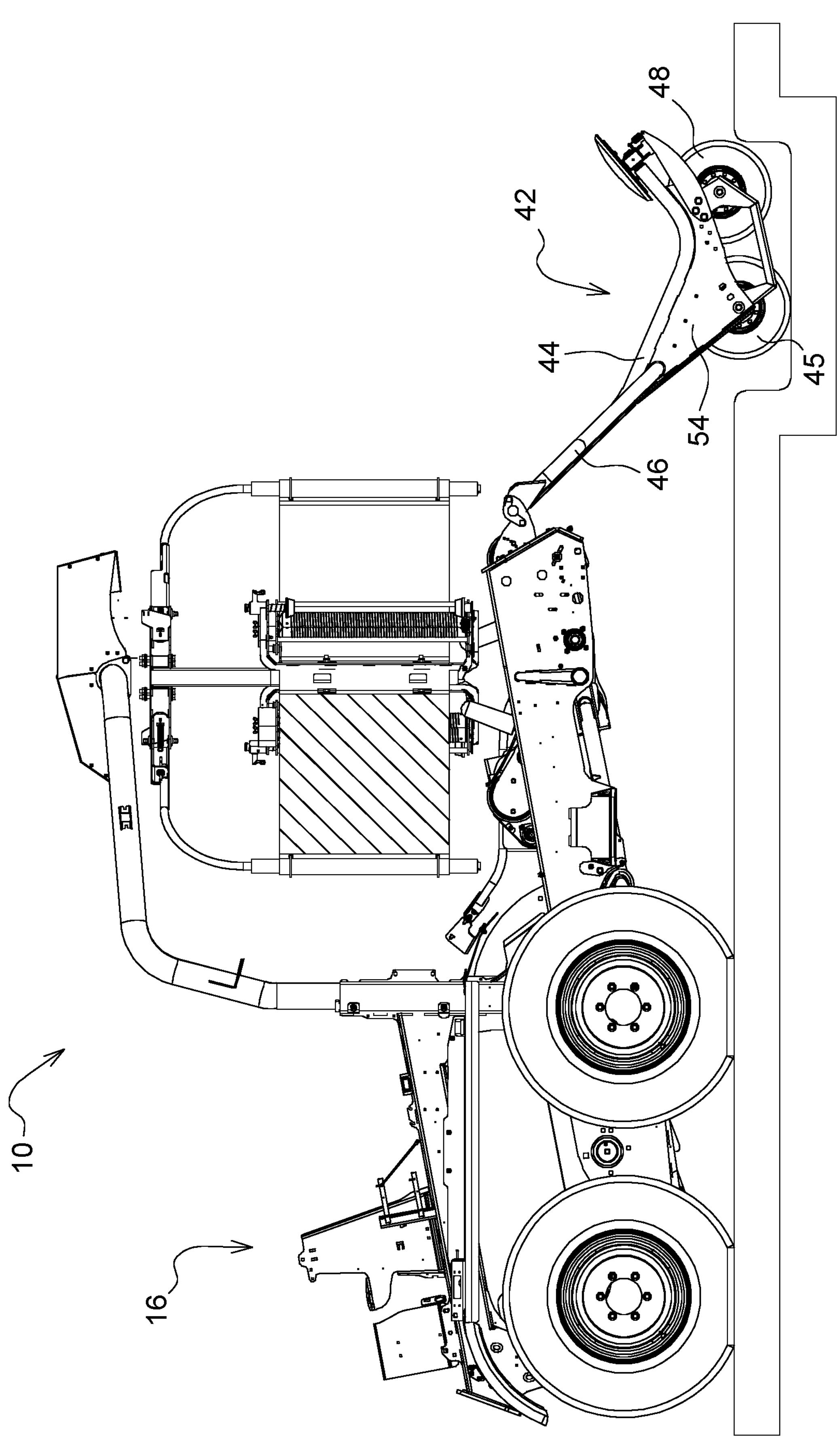
FIG. 3 is a schematic illustration of the second exemplary embodiment of the unloading tipping apparatus.
Figure 6:
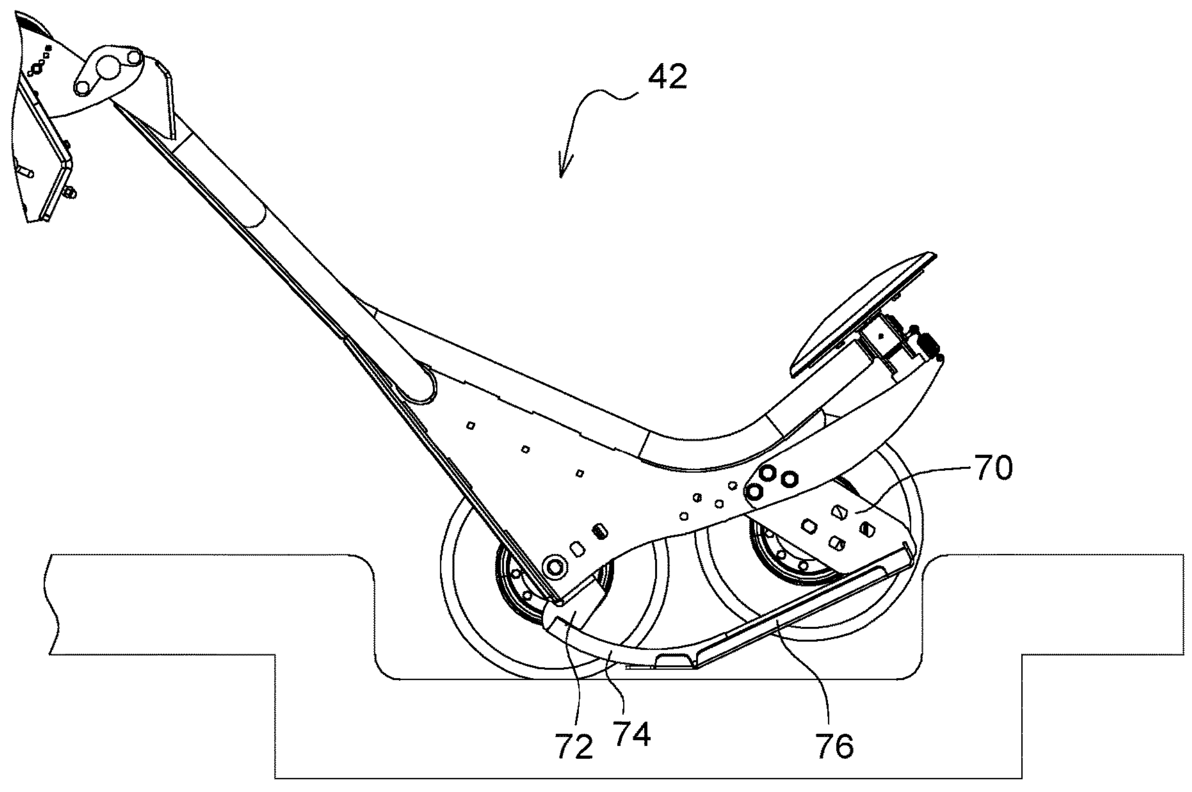
FIG. 6 is a schematic detailed illustration of the second exemplary embodiment of the unloading tipping apparatus.

FIG. 2 shows a schematic perspective view of a wrapper 10 according to the disclosure with a second exemplary embodiment of an unloading tipping apparatus 42 according to the disclosure. FIG. 3 shows a schematic illustration of the second exemplary embodiment of the unloading tipping apparatus 42. FIG. 6 shows a schematic detailed illustration of the second exemplary embodiment of the unloading tipping apparatus 42. The unloading tipping apparatus 42 shown in FIGS. 2, 3 and 6 and the wrapper 10 correspond substantially to the unloading tipping apparatus 42 shown in FIG. 1 and to the wrapper 10 shown in FIG. 1, and therefore only details and/or differences will be discussed below. The combination 12 shown in FIG. 1 may comprise the unloading tipping apparatus 42 shown in FIGS. 2, 3 and 6 and/or the wrapper 10 shown. The second exemplary embodiment will be described below with reference to FIGS. 2, 3 and 6.

The unloading tipping apparatus 42 comprises a first supporting element 45, with which the unloading tipping apparatus 42 can be supported on the ground. The unloading tipping apparatus 42 also comprises a transverse strut 64, a longitudinal strut 44, a diagonal strut 46 and a carrier plate 54, wherein the first supporting element 45 is connected to the carrier plate 54 and the carrier plate 54 is connected to the longitudinal strut 44. The longitudinal strut 44 and the diagonal strut 46 are connected, at one respective end, to the transverse strut 64 and connected, at the other respective end, to the carrier plate 54. The unloading tipping apparatus 42 also comprises a second supporting element 48 and/or a spacer 55.

In the embodiment illustrated, the longitudinal strut 44 is in the form of a tube and extends rearward from the transverse strut 64. The longitudinal strut 44 comprises a plurality of portions, which each form angles with one another and overall approximately form an "L" on its side with a rounded central portion. The transverse strut 64 is for its part rotatably articulated, at its two lateral ends, on portions 62 of the framework 66 of the device 24 by pins 56, said portions extending rearward in the manner of a fork and receiving the transverse strut 64 between them. The obliquely arranged diagonal strut 46 extends obliquely rearward and laterally from the transverse strut 64 and is connected to a carrier plate 54 that extends vertically and in a forward direction V below the rear region of the longitudinal strut 44, said carrier plate for its part being attached to the underside of the longitudinal strut 44. A first supporting pin 52, which supports the first supporting element 45 in the form of a rubber-tired wheel, is connected or fastened to the carrier plate 54 at the rear, lower end of the carrier plate 54. Moreover, a second supporting pin 80 (see FIG. 4), which supports the second supporting element 48 in the form of a rubber-tired wheel, may be connected or fastened to the carrier plate 54 and/or a spacer 55.

The longitudinal strut 44 bears, at its rear, upper end, a stop, in the present case in the form of a disk 50, which is preferably attached to the longitudinal strut 44 so as to be able to rotate freely about the vertical axis. The longitudinal strut 44 is attached to the transverse strut 64 so as to be laterally offset with respect to the longitudinal median plane of the combination 12. The diagonal strut 46 has approximately the same spacing from its adjacent portion 62 as the longitudinal strut 44 has from its adjacent portion 62.

The spacer 55 is connected, in particular releasably or fixedly fastened, to the carrier plate 54. The second supporting element 48 is connected or fastened to the spacer 55, in particular the second supporting element 48 may be rotatably fastened to and/or supported on the spacer 55. Specifically, the second supporting pin (not shown), which supports the second supporting element 48 in the form of a rubber-tired wheel, is connected or fastened to the spacer 55. However, the spacer 55 may also be connected to the first and second supporting elements 45, 48, in particular the first and second supporting elements 45, 48 may be fastened to the spacer 55. The spacer 55 comprises a spacer element 74 and a first and second holder 70, 72. A first end of the spacer element 74 is connected to the first holder 70 and a second end of the spacer element 74 is connected to the second holder 72, in particular releasably or fixedly fastened thereto. A spacer runner 76, which is in the form of a runner or sliding rail, is also connected to the spacer element 74, in particular fastened to the spacer element 74. The spacer 55, in particular the spacer element 74 as well, extend toward or along the carrier plate 54.

As can be seen with reference to FIGS. 1 to 7, a round bale 22' that rolls down from the device 24 that has been tipped rearward and downward will roll down on the longitudinal strut 44 and the diagonal strut 46 and will be deflected to the side by said struts such that it comes to rest with its flat side on the field. The components mentioned form, individually or jointly, deflecting means that are configured to deflect a round bale 22 to the side such that it comes to rest with its flat end side on the ground. In order to prevent, in as simple a manner as possible, the unloading tipping apparatus 42 from becoming stuck on ridges, furrows or other obstacles and ultimately from hitting the wrapper frame or the frame 14 and itself being damaged or damaging the wrapper 10 or the baler 16 during maneuvering operations, in particular any turning operations or while reversing across a field, provision is made for the second supporting element 48 and/or the spacer 55.

Figure 4:
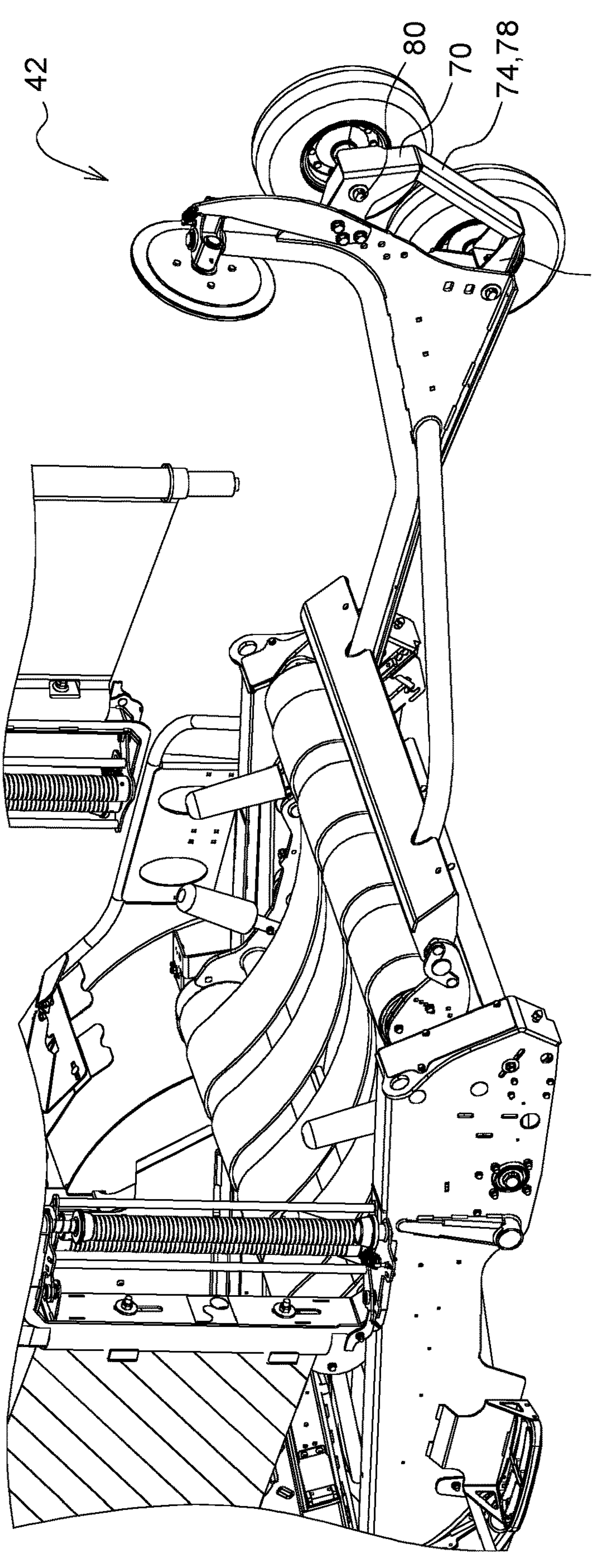
FIG. 4 is a perspective view of a wrapper according to the disclosure with a third exemplary embodiment of an unloading tipping apparatus according to the disclosure.
Figure 5:
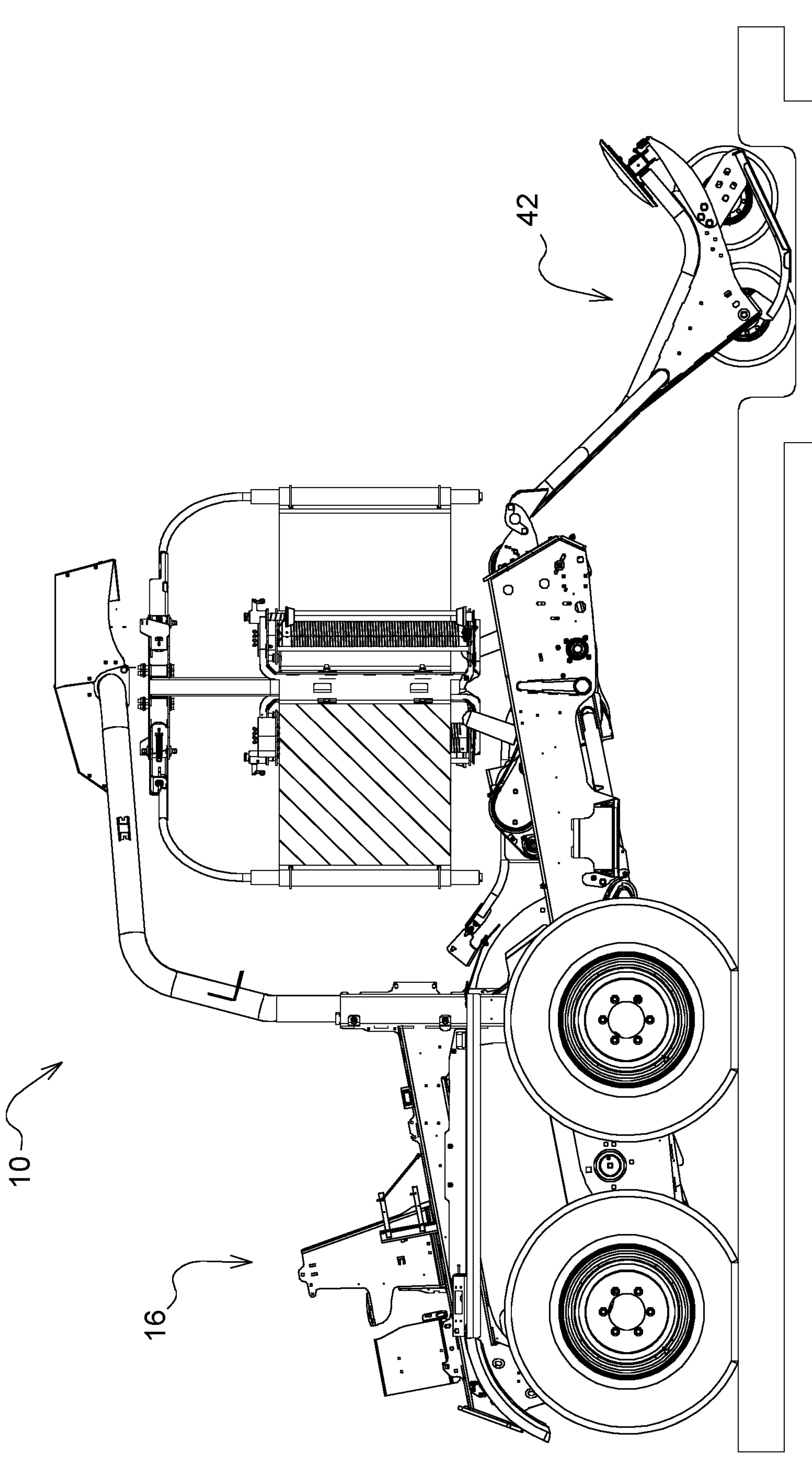
FIG. 5 is a schematic illustration of the third exemplary embodiment of the unloading tipping apparatus.
Figure 7:
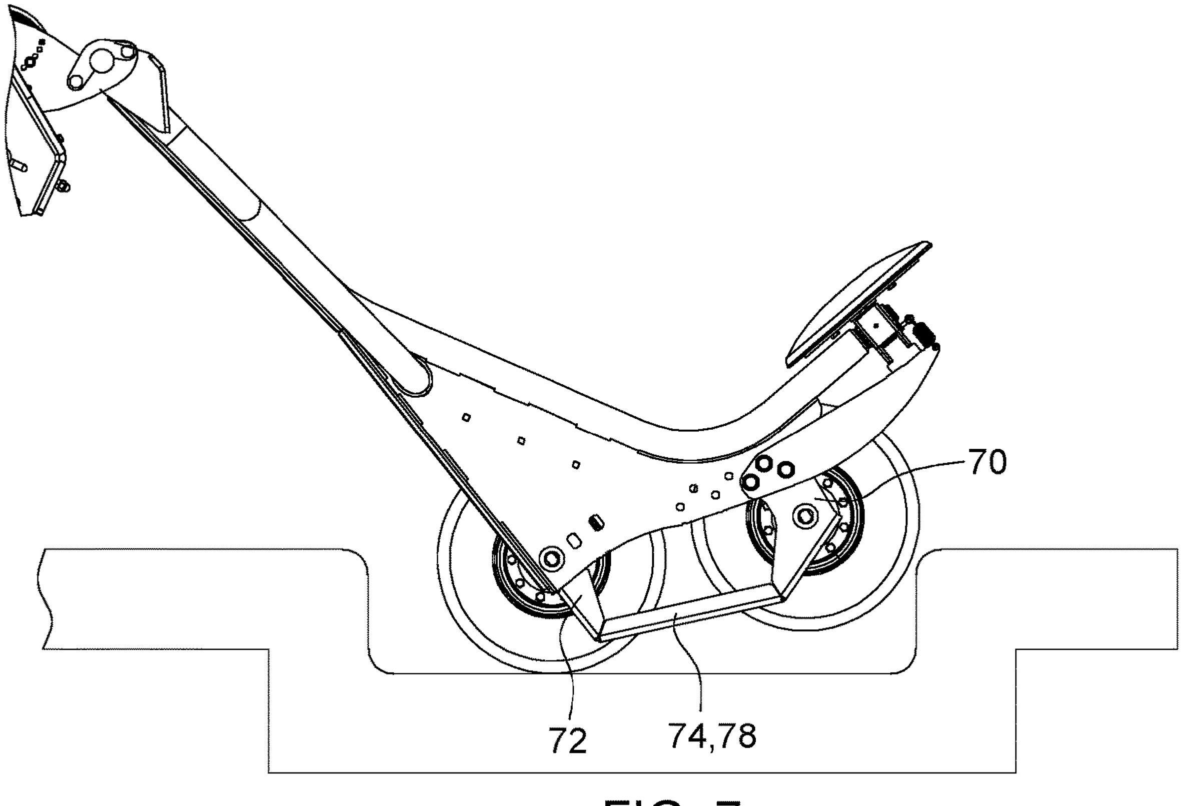
FIG. 7 is a schematic detailed illustration of the third exemplary embodiment of the unloading tipping apparatus.

FIG. 4 shows a perspective view of a wrapper 10 according to the disclosure with a third exemplary embodiment of an unloading tipping apparatus 42 according to the disclosure. FIG. 5 shows a schematic illustration of the third exemplary embodiment of the unloading tipping apparatus 42. FIG. 7 shows a schematic detailed illustration of the third exemplary embodiment of the unloading tipping apparatus 42. The unloading tipping apparatus 42 shown in FIGS. 4, 5 and 7 and the wrapper 10 correspond substantially to the unloading tipping apparatuses 42 shown in FIGS. 1 to 3 and 6 and to the wrappers 10 shown, and therefore only details and/or differences will be discussed below. The combination 12 shown in FIG. 1 may comprise the unloading tipping apparatus 42 shown in FIGS. 4, 5 and 7 and/or the wrapper 10 shown. The third exemplary embodiment will be described below with reference to FIGS. 4, 5 and 7.

The spacer 55 comprises a runner and/or sliding rail, and may in particular alternatively be in the form of a runner or sliding rail. The spacer 55 comprises a spacer element 74, which is in the form of a runner 78. However, the spacer element 74 may alternatively also be in the form of a sliding rail. The spacer 55, in particular the spacer element 74 or the runner 78, extends along or toward the carrier plate 54. The spacer 55 comprises the first and second holders 70, 72, wherein a first end of the spacer element 74 or the runner 78 is connected to the first holder 70 and a second end of the spacer element 74 is connected to the second holder 72.

It should also be noted that, in the embodiment shown, the round bale 22' is placed by the wrapper 10. The wrapper 10 may also be in the form of an individual machine that is moved across a field independently of the baler 16. It would also be possible for a baler 16, the baling chamber of which is also used to wrap the bale 22 (see WO 00/15023 A1), to be provided with an unloading tipping apparatus 42 according to the disclosure.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An unloading tipping apparatus for one of a baler implement or a bale wrapping implement, the unloading tipping apparatus comprising:

a first supporting element with which the unloading tipping apparatus can be supported on the ground, a transverse strut, a longitudinal strut, a diagonal strut and a carrier plate;

wherein the first supporting element is connected to the carrier plate, and wherein the longitudinal strut and the diagonal strut are connected at one respective end to the transverse strut, and are connected at another respective end to the carrier plate;

a spacer connected to the carrier plate; and a second supporting element.

2. The unloading tipping apparatus as claimed in claim 1, wherein the second supporting element is connected to the carrier plate.

3. The unloading tipping apparatus as claimed in claim 1, wherein the spacer is connected to one of the first supporting element and the second supporting element.

4. The unloading tipping apparatus as claimed in claim 1, wherein the spacer comprises a sliding rail.

5. The unloading tipping apparatus as claimed in claim 1, wherein the spacer includes a spacer element.

6. The unloading tipping apparatus as claimed in claim 5, wherein the spacer includes a first holder and a second holder.

7. The unloading tipping apparatus as claimed in claim 6, wherein a first end of the spacer element is connected to the first holder and a second end of the spacer element is connected to the second holder.

8. The unloading tipping apparatus as claimed in claim 1, wherein one of the first supporting element and the second supporting element comprises a wheel.

9. The unloading tipping apparatus as claimed in claim 8, wherein both the first supporting element and the second supporting element comprise a wheel.

10. The unloading tipping apparatus as claimed in claim 1, wherein the transverse strut is coupled to one of a baler or a wrapper so as to be able to pivot about a pin that extends transversely to a forward direction.

11. The unloading tipping apparatus as claimed in claim 10, wherein a round bale rolls from one of a baling chamber of the baler or from a pivotable device of the wrapper onto the longitudinal strut and the diagonal strut.

12. An unloading apparatus for positioning a bale having a cylindrical shape on a circular end face of the cylindrical shape, the unloading apparatus comprising:

a first supporting element with which the unloading apparatus can be supported on the ground, a transverse strut, a longitudinal strut, a diagonal strut and a carrier plate;

wherein the first supporting element is connected to the carrier plate, and wherein the longitudinal strut and the diagonal strut are connected at one respective end to the transverse strut, and are connected at another respective end to the carrier plate;

a second supporting element connected to the carrier plate;

a spacer connected to the carrier plate and supporting the first supporting element and the second supporting element; and wherein the spacer comprises a sliding rail.

13. The unloading apparatus as claimed in claim 12, wherein both the first supporting element and the second supporting element comprise a wheel.

14. The unloading tipping apparatus as claimed in claim 12, wherein the transverse strut is coupled to one of a baler or a wrapper so as to be able to pivot about a pin that extends transversely to a forward direction.

* * * * *